United States Patent [19]
Satoh et al.

[11] Patent Number: 6,101,343
[45] Date of Patent: Aug. 8, 2000

[54] IMAGE FORMING APPARATUS AND METHOD FOR REMOVING FRINGE PATTERNS

[75] Inventors: Fumio Satoh, Habikino; Takashi Sugitou, Kashihara; Kenichi Morimoto, Kyoto, all of Japan

[73] Assignee: Sharp Kabushiki Kaisha, Osaka, Japan

[21] Appl. No.: 09/110,316

[22] Filed: Jul. 6, 1998

[30] Foreign Application Priority Data

Jul. 11, 1997 [JP] Japan ................................. 9-186132

[51] Int. Cl.$^7$ ................................................. G03G 15/02
[52] U.S. Cl. ............................................. 399/50; 399/176
[58] Field of Search ........................... 399/46, 174, 175, 399/176, 50

[56] References Cited

U.S. PATENT DOCUMENTS

| | | | |
|---|---|---|---|
| 4,727,453 | 2/1988 | Ewing | 399/176 X |
| 4,851,960 | 7/1989 | Nakamura et al. | 399/166 X |
| 5,576,808 | 11/1996 | Ikegawa et al. | 399/175 |

FOREIGN PATENT DOCUMENTS

| | | |
|---|---|---|
| 63-149669 | 6/1988 | Japan . |
| B2 7-89249 | 9/1995 | Japan . |

*Primary Examiner*—Fred L. Braun

[57] ABSTRACT

An image forming apparatus includes a voltage generating section for generating one of an AC voltage and a voltage obtained by superposing an AC voltage on a DC voltage; an image carrier; and a contact charger for receiving the voltage generated by the voltage generating section and giving a surface potential corresponding to the received voltage to the image carrier by contact. Further, it includes a latent image forming section for forming a latent image by scanning the image carrier with a predetermined scanning period, and a control section for controlling the voltage generating section and the latent image forming section. The control section controls the voltage generating section and the latent image forming section so that a period of an AC component of the voltage generated by the voltage generating section is N times or 1/N times as long as the scanning period, where N is a natural number.

15 Claims, 9 Drawing Sheets

IMAGE FORMING APPARATUS AND METHOD FOR REMOVING FRINGE PATTERNS

CROSS-REFERENCES TO RELATED APPLICATIONS

This application is related to Japanese Patent Application No. HEI 09-186132 filed on Jul. 11, 1997 whose priority is claimed under 35 USC §119, the disclosure of which is incorporated herein by reference in its entirety.

BACKGROUND OF THE INVENTION

1. Field of the Invention

The present invention relates to an image forming apparatus and, more particularly, to an image forming apparatus of electrophotographic type using a contact charging method, such as a copier or a printer.

2. Description of the Related Arts

Heretofore, a corona discharger has often been used as means for charging a photoreceptor of a copier or printer of an electrophotographic type. However, a contact charging method has recently been used in which a charger having a shape like a brush, roller, blade, or belt is allowed to be in contact with the photoreceptor or is held opposite to the photoreceptor with a small gap maintained therebetween.

This method can obviate a defect, when a device using a corona discharger generates poisonous ozone or a high voltage of about several kilovolts must be applied to the corona discharger for providing a charging potential required for the photoreceptor.

Further, the contact charging method may involve a problem that the contact state between the charger and the photoreceptor is not uniform and it is not possible to obtain a uniform surface potential because there is a variation in the surface shape and surface roughness of the photoreceptor or in the shape, physical properties, or the like of the contact charger. Accordingly, various attempts have been made to overcome this problem. For example, Japanese Unexamined Patent Application No. SHO 63(1988)-149669 proposes a method in which a DC current with a superposed AC current is applied to the charger.

However, this method is accompanied by a drawback a charging irregularity (unevenness) called strobing, banding, or cycle spots is generated in the moving direction of the photoreceptor due to the AC voltage component. If the AC voltage is high, the surface potential will be high; whereas if the AC voltage is low, the surface voltage will be low. In the reverse developing method, which is often used in a laser printer or the like, the developed density will be low when a portion with a high surface potential is exposed to light, whereas the developed density will be high when a portion with a low surface potential is exposed to light.

In the meantime, the frequency of the AC voltage component is suitably selected in accordance with the electrophotographic process used in the device. Typically, a frequency within a range of several tens Hz to several hundreds Hz is used. If the exposure frequency in the sub-scanning direction is near the frequency of the AC voltage component, there arises a case in which a portion having a high surface potential is exposed to light and a case in which a portion having a low surface potential is exposed to light. When black is recorded on the entire surface of the recording paper, a larger density portion and a smaller density portion will appear alternately and a fringe pattern corresponding to the frequency of the AC voltage component is observed. Also, when nothing is recorded, a density unevenness of ground fogging will appear.

Sometimes, these phenomena may not be observed if the frequency of the AC voltage component is high. However, if an image is to be formed on a lateral line, which is a main scanning direction, alternately in white/black lines, or in one white line/two black lines, or in two white lines/one white line, a fringe pattern appears due to an interference with the charging unevenness generated with an interval corresponding to the frequency of the AC voltage component, making the record extremely difficult to discern.

Figure 5:
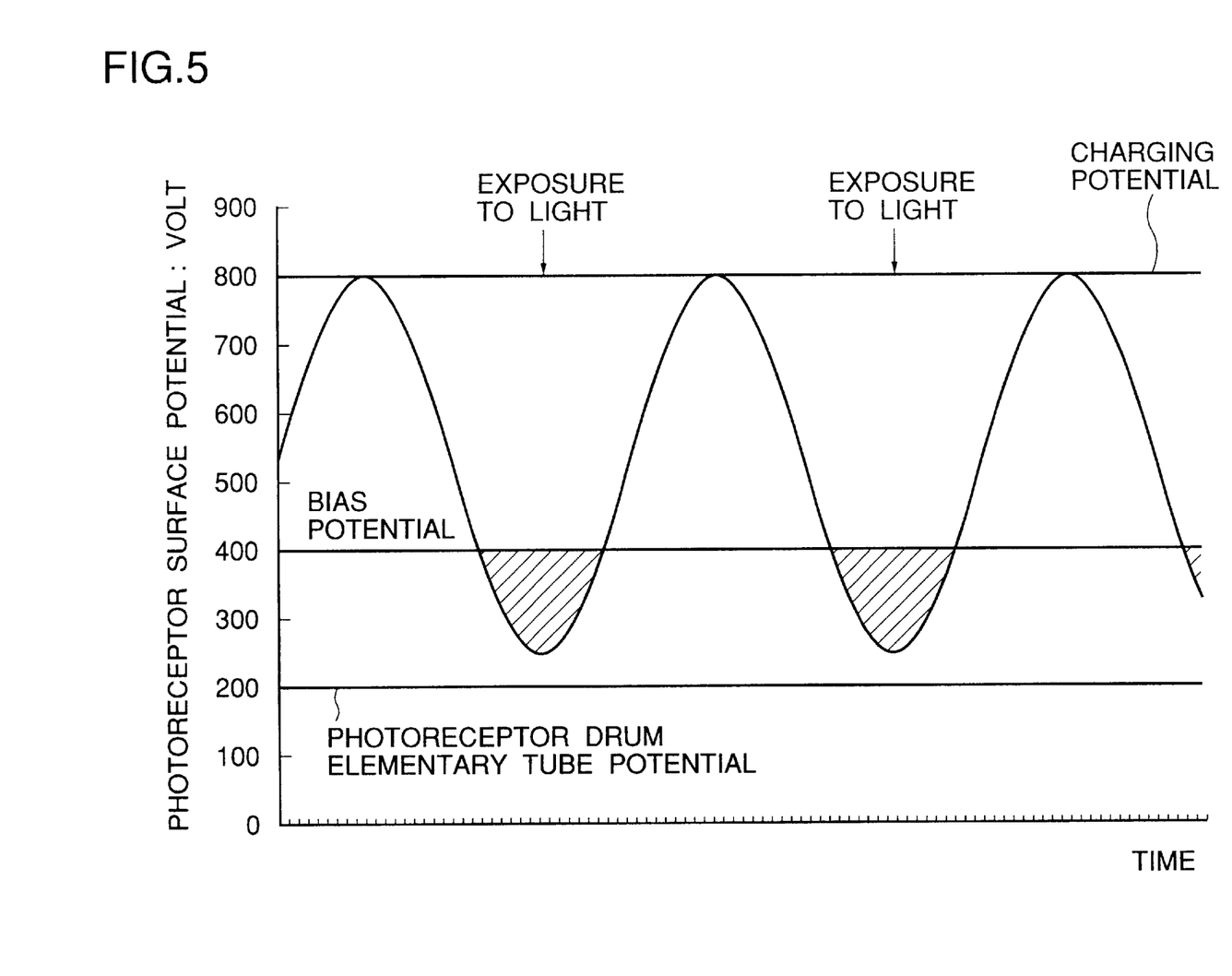
FIG. 5 is a graph showing a photoreceptor surface potential and a change in potential caused by exposure to light according to the present invention.
Figure 6A:
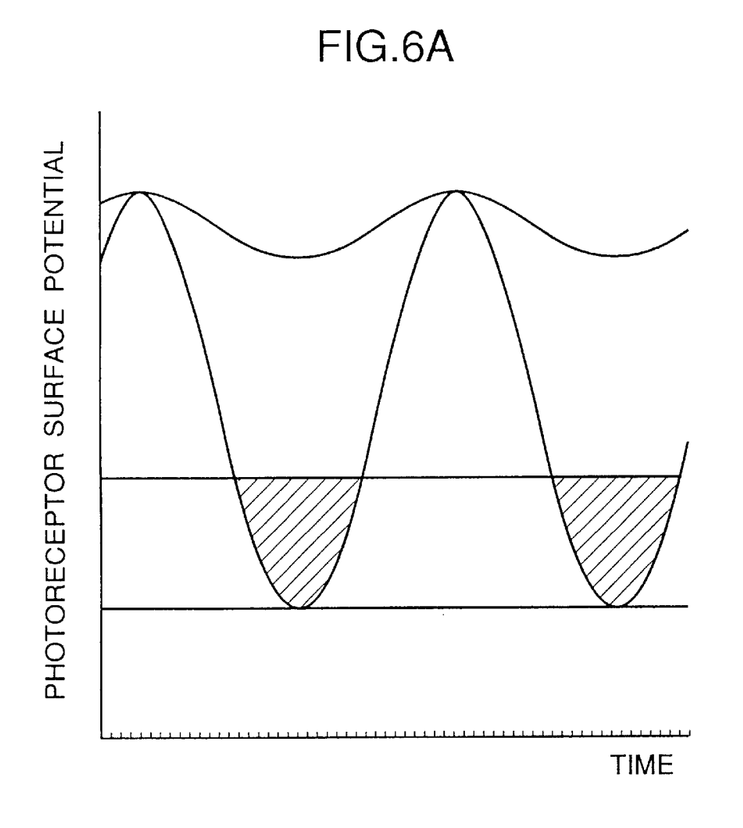
FIGS. 6(a) and 6(b) are graphs showing a change in potential caused by exposure to light when an unevenness of surface potential is generated by an AC voltage according to the present invention.
Figure 6B:
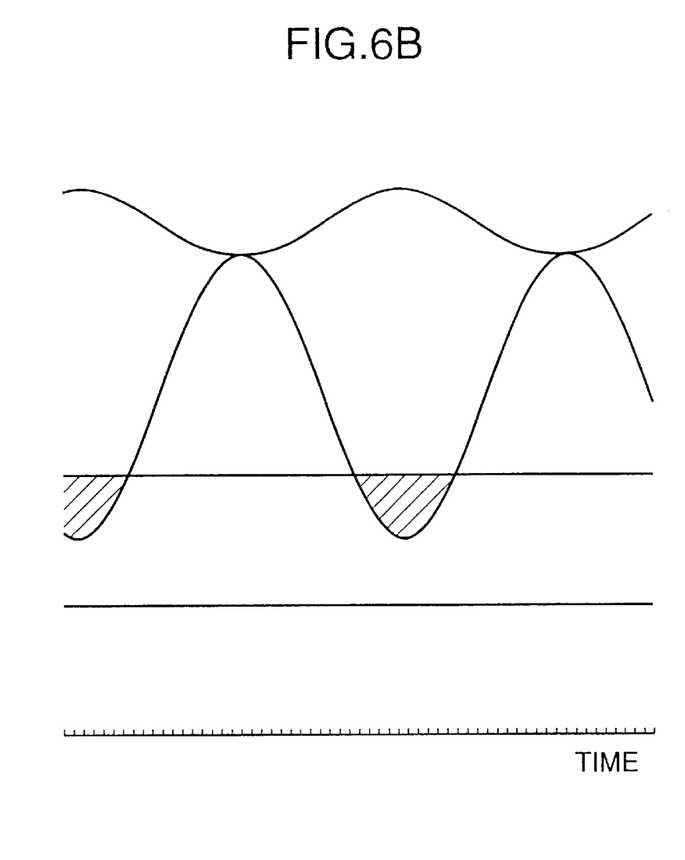
Figure 7:
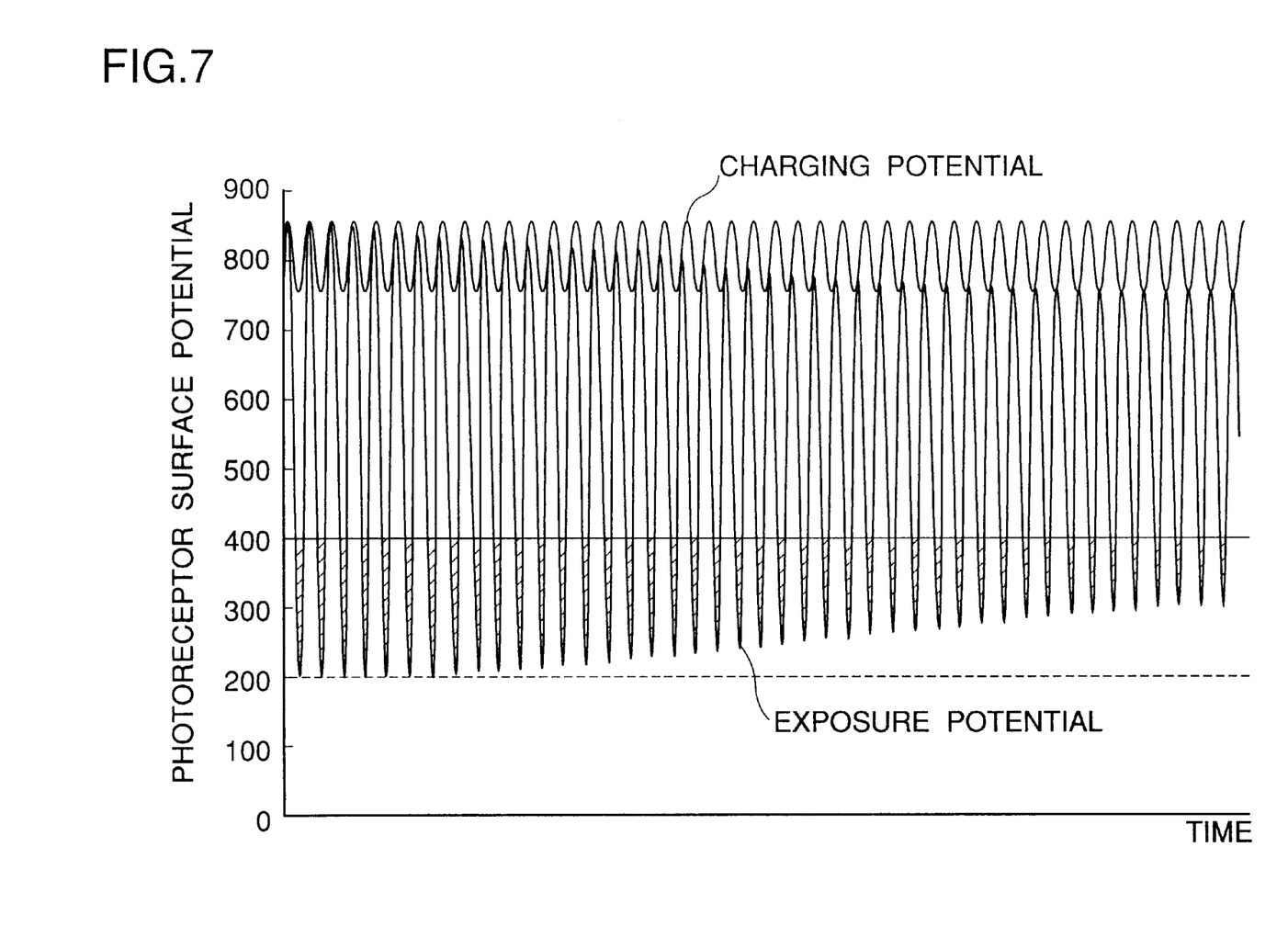
FIG. 7 is a graph showing a change in image when a period of the AC voltage is slightly different from a period of exposure to light.

FIG. 5 shows a state of a photoreceptor surface potential in the case where an image is to be formed in alternate black line/white line in a state uniformly charged with the photoreceptor surface potential of 700V. The portion (hatched portion) being lower than the developing bias potential (400V) is developed in black. When an unevenness of photoreceptor surface potential is generated by the AC voltage component applied to the charger, the developed image of a line will be narrow and thin when a high potential portion is exposed to light as shown in FIG. 6(b), whereas it will be wide and thick when a low potential portion is exposed to light as shown in FIG. 6(a).

Further, in the case where the frequency of the AC voltage component does not coincide with the pitch and period of the exposure to light, both a line developed to be wide and thick and a line developed to be narrow and thin will appear on one page of the recording sheet. This is caused by the interference between the period of the charging unevenness and the period of exposure to light. The interference is observed as a fringe pattern with thick/thin portions having a period which is equal to the difference of the periods.

Thus, when the frequency of the charging unevenness caused by the AC voltage component and the frequency of the scanning lines is slightly different, the difference generates what is called a "beat" in acoustics, thereby producing a fringe pattern.

For example, if characters are printed at 600 dpi in an apparatus with a photoreceptor velocity of Vp=25 mm/s and an AC voltage component of f=300 Hz, the unevenness of the surface potential is generated on the photoreceptor at a pitch of Vp/f=0.08333 mm. In the case where a black line and a white line are alternately printed, the pitch of black scanning lines will be 25.4/600×2=0.04233×2≈0.084667 mm. Since the frequency of the black scanning lines is 25/0.084667≈295.2755 Hz. Thus difference in frequency is 300 Hz–295.2755 Hz=4.7245 Hz. Thus a fringe pattern with thick/thin portions having a period of 25/4.7245=5.29 mm appears on the photoreceptor surface, and the image quality is extremely deteriorated.

Methods for improving this situation are disclosed in U.S. Pat. No. 4,727,453 and No. 4,851,960. U.S. Pat. No. 4,727,453 discloses that a contact charger is brought into contact with a photoreceptor for a time interval of 1/f provided that the frequency of the AC voltage is f. In this method, the frequency of the AC voltage, the surface velocity of the photoreceptor, and the contact width must be maintained in a predetermined relationship, so that the construction of the apparatus will be constrained. On the other hand, U.S. Pat. No. 4,851,960 has the following constraints. Namely, the amplitude of the AC voltage component must be more than twice the initial charging voltage, and the shape of the charger must be such that it gradually departs away from the photoreceptor surface.

Also, it sometimes happens that, if the frequency of the AC voltage component approaches the spatial frequency represented by lateral lines on a recording sheet having an image formed thereon, a fringe pattern is generated in the image. In order to prevent this, Japanese Examined Patent Publication No. HEI 07(1995)-89249 discloses that the frequency f of the AC voltage component and the moving velocity Vp of the photoreceptor are adjusted so that N times or 1/N times the minimum interval of the scanning lines (where N is a natural number) does not overlap the variation range of the spatial wavelength (Vp/f).

Here, the fringe pattern in question is generated as follows. When a portion of the charging roller having a weakened endurance has an electrostatic capacitance, the charging phase is shifted to produce cycle spots which are curved in the axial direction of the photoreceptor. If a lateral line coincides with this curved portion having a low potential, it is developed thickly to generate the fringe pattern. Therefore, the method disclosed in the above Publication does not prevent generation of the fringe pattern when the frequency of the charging unevenness caused by the AC voltage component and the frequency of the scanning lines is slightly different.

Even without using the above-mentioned methods, it is possible to avoid this phenomenon by separately adding an oscillator which generates a frequency of an AC voltage component and adjusting the frequency so as to allow the frequency to completely coincide with the scanning pitch. However, this solution increases the costs of the apparatus and necessitates an apparatus-by-apparatus adjustment.

SUMMARY OF THE INVENTION

The present invention provides an image forming apparatus comprising: a voltage generating section for generating one of an AC voltage and a voltage obtained by superposing an AC voltage on a DC voltage; an image carrier; a contact charger for receiving the voltage generated by the voltage generating section and giving a surface potential corresponding to the received voltage to the image carrier by contact; a latent image forming section for forming a latent image by scanning the image carrier with a predetermined scanning period; and a control section for controlling the voltage generating section and the latent image forming section, wherein the control section controls the voltage generating section and the latent image forming section so that a period of an AC component of the voltage generated by the voltage generating section is N times or 1/N times as long as the scanning period, where N is a natural number.

BRIEF DESCRIPTION OF THE DRAWINGS

The present invention will be better understood from the following detailed description of preferred embodiments of the invention, taken in conjunction with the accompanying drawings, in which.

DETAILED DESCRIPTION OF THE PREFERRED EMBODIMENTS

The voltage generating section of the present invention may be, for example, a high voltage generating circuit for generating a voltage obtained by superposing an AC 600V (peak-to-peak voltage) of 200 to 300 Hz on a DC 950V. Preferably, the amplitude and the frequency of its AC component are controlled by a PWM (Pulse Width Modulation) signal from outside.

The image carrier of the present invention may include, for example, an electrophotographic photoreceptor or an electrostatic recording dielectric of a drum type or a belt type which is driven at a predetermined speed in a predetermined direction.

The contact charger applies a voltage generated by the voltage generating section to the image carrier while being in contact with the image carrier. The contact charger may be of a brush type, a roller type, a blade type, a belt type, or the like.

The latent image forming section periodically scans the image carrier in a direction (main scanning direction) perpendicular to the direction (sub-scanning direction) of the movement of the image carrier by means of, for example, a laser beam modulated by the image data, whereby an electrostatic latent image is formed on the image carrier.

The control section may include an oscillator for generating a system clock signal, whereby the control section may determine the period of the AC component and the scanning period on the basis of the system clock signal.

The control section may generate a pulse width modulation signal having the period of the AC component, whereby the voltage generating section may generate the AC component on the basis of the pulse width modulation signal.

The control section may include an oscillator for generating a system clock signal, a first frequency divider for generating a first frequency division clock signal by frequency division of the system clock signal, and a second frequency divider for generating a second frequency division clock signal by frequency division of the system clock signal. Thereby the control section may determine the scanning period on the basis of the first frequency division clock signal and may determine the period of the AC component on the basis of the second frequency division clock signal. Further the periods of the first and second frequency division clock signals may be related with each other so that the period of the AC component is N times or 1/N times as long as the scanning period.

The control section may include an oscillator for generating a system clock signal and a frequency divider for generating a frequency division clock signal by frequency division of the system clock signal, whereby the control section may allow the period of the AC component to be N times or 1/N times as long as the scanning period on the basis of the frequency division clock signal.

The control section may include a memory for pre-storing a table showing a relationship between a time represented in system clock cycle and a pulse width represented in system clock cycle in correspondence with a waveform of one period of the AC component, whereby the control section may generate the pulse width modulation signal on the basis of the pulse width read out from the table.

The control section may include a memory for pre-storing a periodic function having the same period as the AC component and showing a relationship between a time represented in system clock cycle and a pulse width represented in system clock cycle. Thereby, the control section may generate the pulse width modulation signal on the basis of the pulse width calculated using the periodic function.

EMBODIMENTS

First Embodiment

Figure 1:
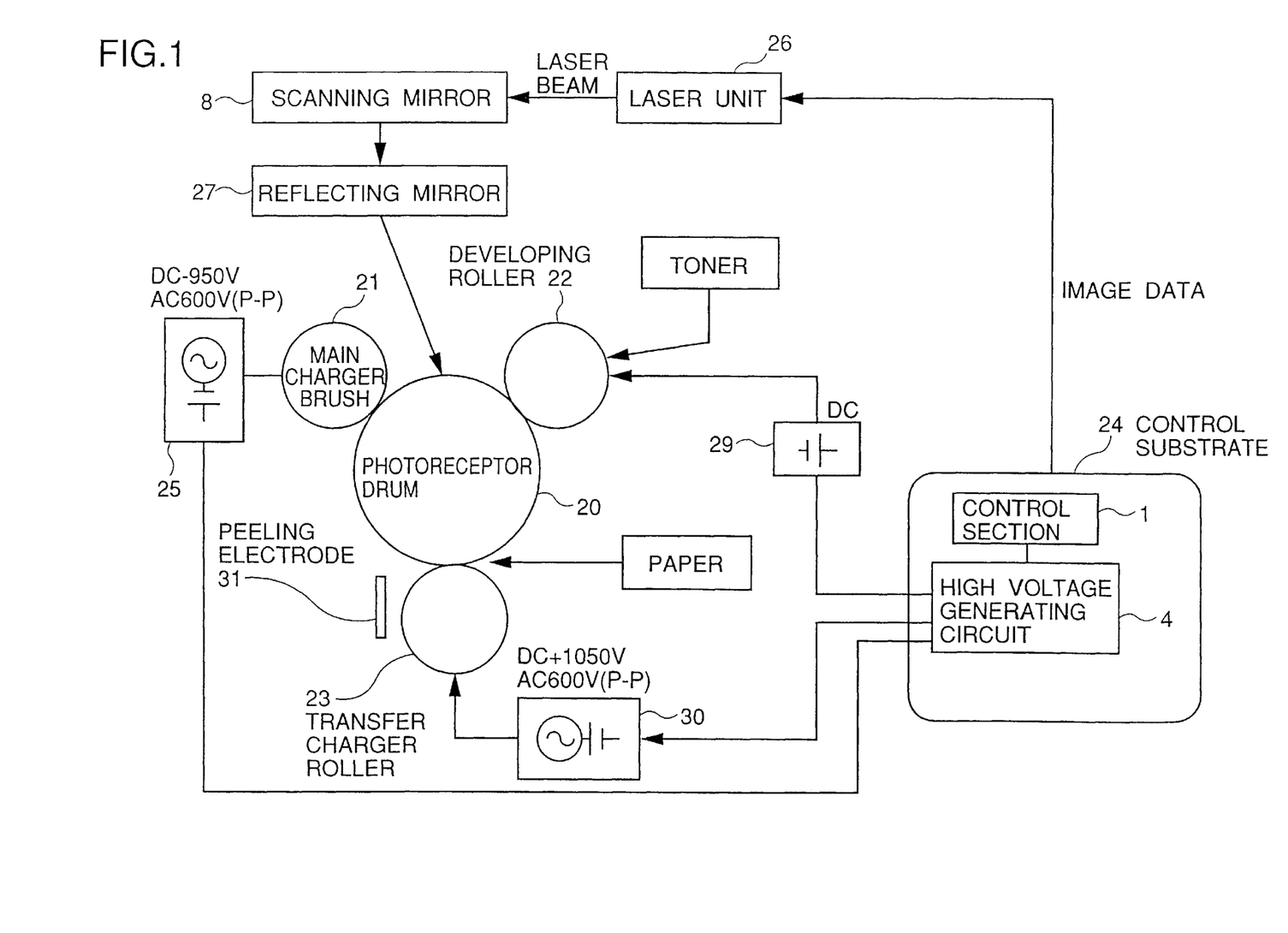
FIG. 1 is a view showing a construction of a laser printer as an image forming apparatus according to the present invention.

FIG. 1 is a view showing a construction of a laser printer as an image forming apparatus according to the present invention. Here, the construction related to the control of the laser printer is the same as that shown in FIG. 8.

A photoreceptor drum 20 acts as an image carrier and is rotated and driven in a clockwise direction at a predetermined processing speed. Along the outer periphery thereof, a charger 21, a developing roller 22, and a transfer charger roller 23 are disposed. Further, a cleaner and a static eliminator (electricity remover), which are not shown, are disposed.

The charger 21 includes a main charger brush and is a contact-type charger which provides a surface potential to the photoreceptor drum 20 by being in contact with the photoreceptor drum 20. From a power supply 25 connected to a high voltage generating circuit 4 mounted on the control substrate 24, the charger 21 applies a voltage obtained by superposing an AC voltage component of AC 600V (P—P) on DC 950V so as to charge the surface of the photoreceptor drum 20 to be about 700V. The charger 21 may include an electrically conductive roller, belt, or blade instead of the brush. The voltage to be applied may be formed of an AC voltage alone, and the AC voltage component may be a sinusoidal wave, a triangular wave, or a rectangular wave.

A laser scanning unit 3 acts as a latent image forming device for forming a latent image on the photoreceptor drum 20 along the scanning lines drawn with a predetermined pitch. The laser scanning unit 3 includes a laser unit 26, a scanning mirror 8, and a reflecting mirror 27. When an image data is inputted into CPU 1 via an interface 6 and a controller 28 from a host computer 5 such as a computer or a word processor, a laser diode of the laser unit 26 emits toward the scanning mirror 8 a laser beam modulated by the image data. The scanning mirror 8 is rotated and driven at a predetermined speed by a scanning motor 7, whereby the laser beam is deflected by the scanning mirror 8 and reflected by the reflecting mirror 27 to scan and expose the surface of the photoreceptor drum 20 in an axial direction. This scanning operation removes some of the electricity on the surface of the photoreceptor drum 20, whereby an electrostatic latent image is formed on the photoreceptor drum 20 on the basis of the image data. Here, one scanning line is drawn by one rotation of the scanning motor 7.

Since DC 400V is applied to the developing roller 22 from the DC power supply 29, the toner adhering to the developing roller 22 is adsorbed by a portion of the photoreceptor drum 20 having a lower surface potential, whereby the electrostatic latent image is developed to be a toner image.

Also, a voltage obtained by superposing an AC voltage component of AC 600V (P—P) on DC 1050V is applied to the transfer charger roller 23 from the power supply 30, whereby the toner image is transferred to a recording paper passing between the photoreceptor drum 20 and the transfer charger roller 23. The recording paper is peeled off from the photoreceptor drum 20 by a peeling electrode 31 and is fixed by a fixing device (not shown).

Figure 8:
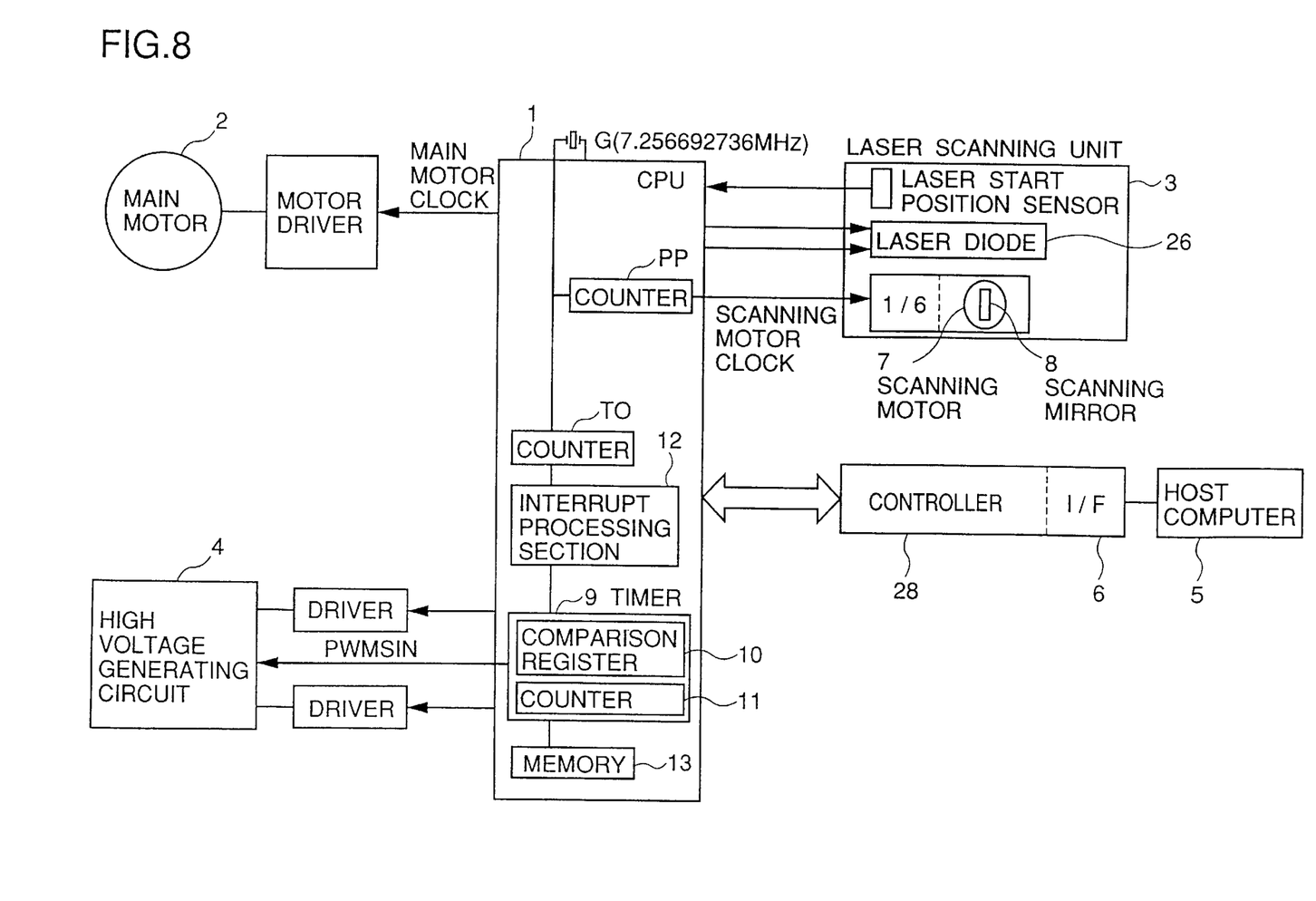
FIG. 8 is a control block diagram of the laser printer according to the present invention.
Figure 9:
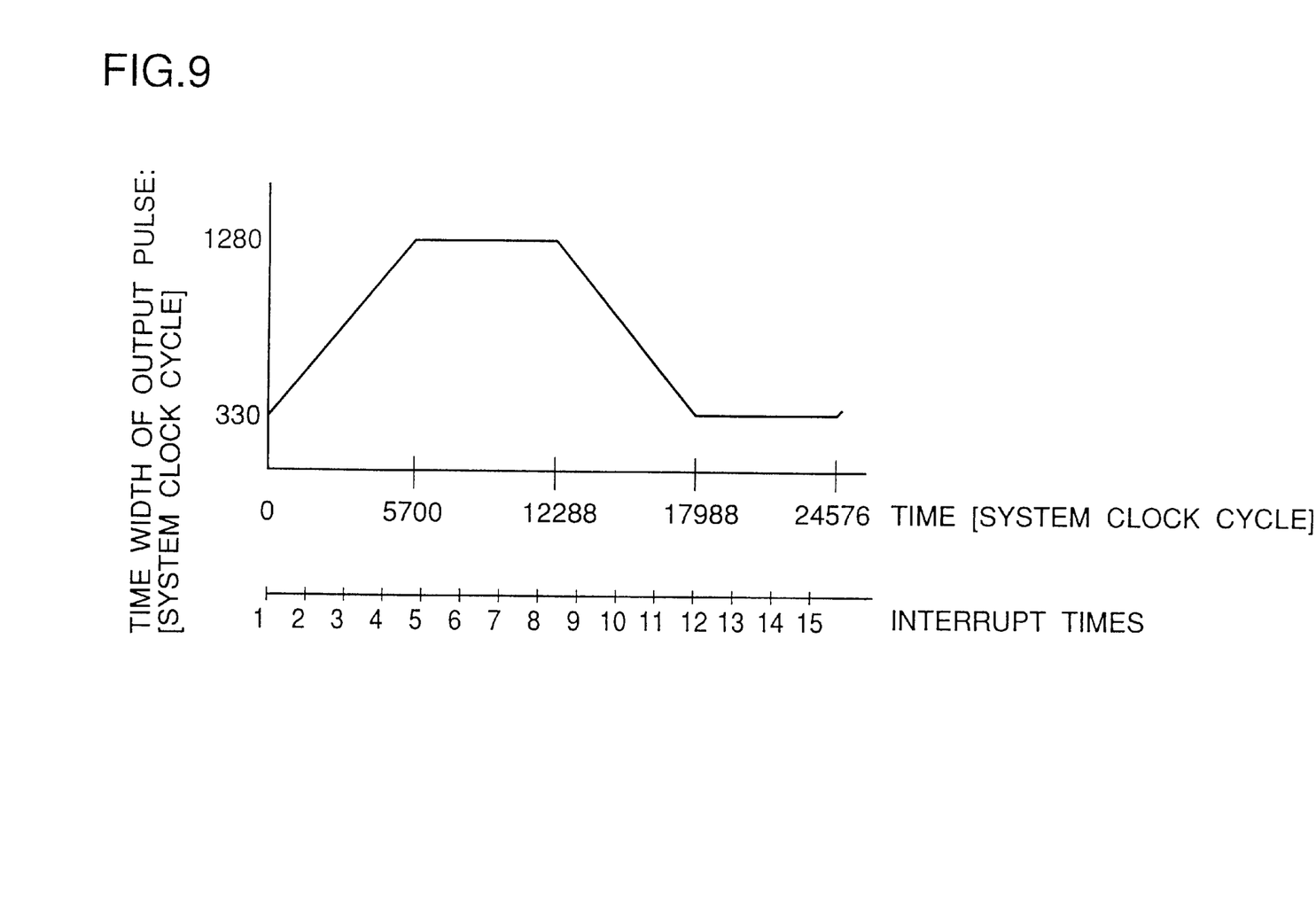
FIG. 9 is a graph showing a waveform of a pulse width modulation signal outputted for each interrupt processing according to prior art.

Elements such as the charger 21 and the laser scanning motor 7 are driven and controlled by the control section 1. The control section 1 is a microcomputer having a CPU, a ROM, a RAM, and the like incorporated therein, and is driven by means of a clock generated by a quartz vibration oscillator G acting as a system clock. The control section 1 includes counters PP and TO, a timer 9, an interrupt processing section 12, and a memory 13. Each of the counters PP and TO divides the frequency of the system clock. The timer 9 includes a comparison register 10 and a counter 11. The counter 11 is cleared when a value set in the comparison register 10 coincides with a value obtained by counting the system clock cycles in the counter 11.

Here, the oscillator G generates a clock of 7.256692736 MHz and the counter PP generates a scanning motor clock obtained by frequency division of the system clock using a frequency division value of 4096. Since the laser scanning unit 3 is constructed in such a manner that the scanning motor 7 is rotated at a rotation frequency of ⅙ of the frequency of the scanning motor clock, the scanning motor 7 is rotated for one turn in 4096×6=24576 system clock cycles. The rotation frequency of the scanning motor 7 is 7.25662736 MHz/24576=295.2755 Hz. Therefore, the laser beam scans on the photoreceptor drum 20 at a frequency of 295.2755 Hz.

The frequency division value of the counter TO is set to be 1536. This value corresponds to ¹⁄₁₆ of the frequency of the system clock. The interrupt processing section 12 performs an interrupt processing each time the time counted in system clock cycle increases by 1536. When the interrupt processing is started, the counter 11 is cleared and a given value stored in the memory 13 is set in the comparison register 10. When the system clock is counted for the number set in the comparison register 10, the counter 11 is reset and a pulse having a time width corresponding to the number set in the comparison register 10 is outputted to the high voltage generating circuit 4.

Figure 2:
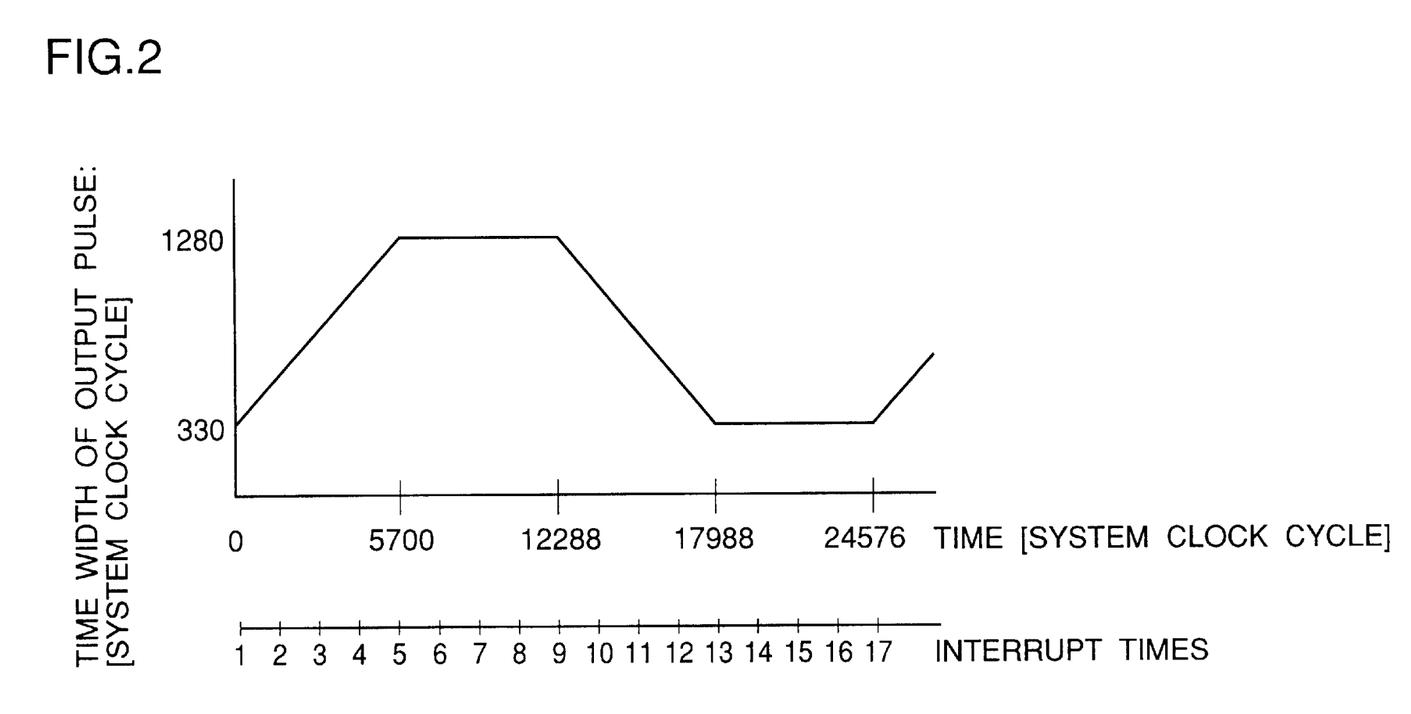
FIG. 2 is a graph showing a waveform of a pulse width modulation signal outputted for each interrupt processing in a first embodiment of the present invention.

If the number to be set in the comparison register 10 is increased or decreased for each interrupt processing, a pulse width modulation signal corresponding to the value can be outputted. Here, the values to be repeated for every 16 times of the interrupt processing are read from the memory 13 and set in the comparison register 10. Therefore, a pulse width modulation signal in which one period corresponds to 24576 system clock cycles can be generated. Table 2 shows the number of interrupt processing times and the values to be set in the comparison register 10. FIG. 2 shows a relationship between the time width of the pulse outputted from the timer 9 and the time counted in system clock cycle.

Table 2

TABLE 2

| number of interrupts | 1 | 2 | 3 | 4 | 5 | 6 |
|---|---|---|---|---|---|---|
| values set in register | 330 | 586 | 842 | 1098 | 1280 | 1280 |

TABLE 2-continued

| number of interrupts | 7 | 8 | 9 | 10 | 11 | 12 |
|---|---|---|---|---|---|---|
| values set in register | 1280 | 1280 | 1280 | 1024 | 768 | 512 |
| number of interrupts | 13 | 14 | 15 | 16 | 17 | |
| values set in register | 330 | 330 | 330 | 330 | 330 | |

The pulse outputted from the timer 9 is a pulse width modulation signal (PWMSIN) varying in a trapezoidal waveform. The period of the pulse corresponds to 1536×16=24576 system clock cycles and coincides with the period of one turn of the scanning motor 7. The PWMSIN signal is inputted into the high voltage generating circuit 4 and is converted into a waveform similar to a sinusoidal wave by a low-pass filter (not shown), whereby a high voltage with the AC voltage component superposed on a DC current is generated and applied to the charger 21.

As shown above, by setting the frequency division value of the counter TO so that N times the number of interrupt processes in one period coincides with the time counted in system clock cycle for one turn of the scanning motor, it is possible to allow the period for one turn of the scanning motor 7, namely the period of the scanning lines, to coincide with the period of the AC voltage component of the voltage applied to the charger 21. Therefore, even if an alternating change in the surface potential is generated due to the AC voltage component, the period of the alternating change coincides with the period of the scanning lines, so that generation of interference fringes due to difference in the periods can be prevented and an image of high quality can be formed.

Also, even if a fringe pattern of uneven density is generated due to the interference, its period will be longer than the length of a recording sheet in the feeding direction. Therefore, the maximum density and the minimum density will not coexist on one recording paper. This reduces deterioration of the image quality.

Further, since the AC voltage component is generated in accordance with the interrupt processing of the CPU 1, generation of the high voltage can be realized by a programming process. This eliminates the need for adding a separate oscillator or an additional circuit outside of the microcomputer, thereby preventing the increase of costs of the apparatus and eliminating the need for apparatus-by-apparatus adjustment.

Especially, by making the two periods coincide with each other completely, the control program will be simplified. Moreover, a laser printer can be realized which is not affected by changes in the environment and which has no apparatus-by-apparatus variation.

Here, in the above embodiment, the period of the AC voltage component is made to coincide with the period for one turn of the scanning motor 7. But, there are cases where the period of the AC voltage component cannot be made to coincide with the period of the scanning motor 7 because the period of the scanning lines varies in accordance with the peripheral speed of the photoreceptor or the desired recording density. It is clear that, in such a case, generation of interference fringes can be prevented by making the period of the AC voltage component coincide with N times or 1/N times the period of the scanning lines.

Second Embodiment

During the interrupt processing in the laser printer, control of the main motor 2, detection by various sensors, and the processing of the communication interface with an upper level device are performed. Therefore, there are cases where the period of the interrupt processing cannot be independently set. Accordingly, in this embodiment, a periodic function varying with a period corresponding to the period of the scanning lines is set so as to deal with these cases. By substituting the periodic function with the time counted in system clock cycle, the number of clock cycles to be set in the comparison register 10 is determined. Further, by outputting a pulse having a time width corresponding to the number of clock cycles, the period of the AC voltage component is made to coincide with the period of the scanning lines.

Namely, a stepping motor is used as the main motor 2, and a main motor clock is outputted from the CPU 1. Since the rotation speed of the main motor 2 is determined by the frequency of the main motor clock, the rotation speed and the peripheral speed of the photoreceptor drum 20 driven by the main motor 2 are also determined by the frequency of the main motor clock. Therefore, the apparatus is constructed so that the period of the main motor clock is determined by the number of interrupt processing times. Since the processing speed (printing speed) of the laser printer is determined beforehand by the apparatus or the system in which it is used, the peripheral speed of the photoreceptor drum changes when the period of the interrupt processing is changed, so that it cannot be determined from other requirements. In this laser printer, the required speed for the photoreceptor drum 20 is 25 mm/s because of the printing speed set forth in the specification of the apparatus. Since the period of the interrupt processing is determined by the rotation speed of the main motor 2 and the speed reduction ratio to the photoreceptor drum 20, the frequency division value of the counter TO must be 1656. The other features of the construction are the same as those of the first embodiment.

Figure 3:
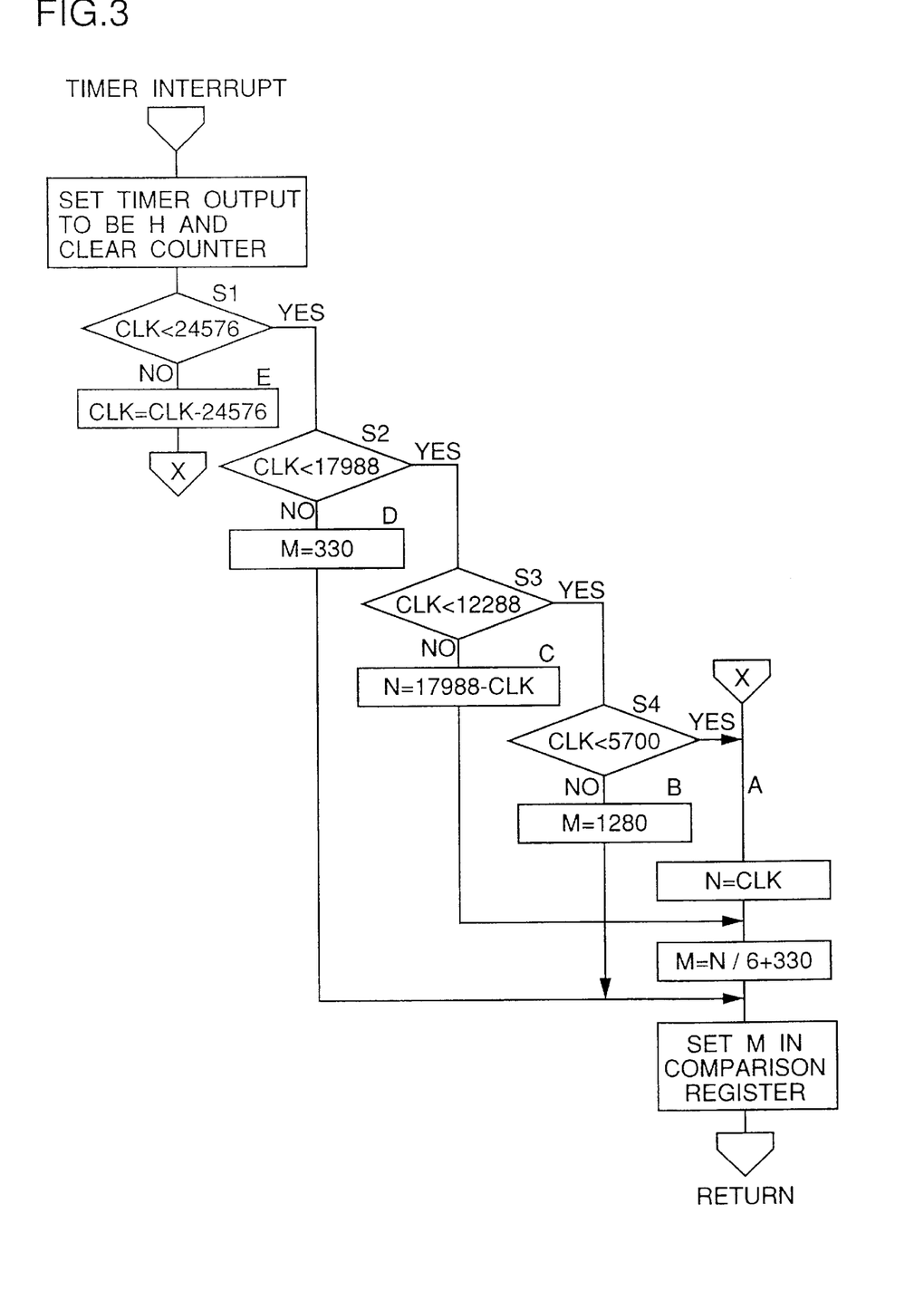
FIG. 3 is a flow chart in determining the number of clock cycles for outputting a pulse width modulation signal according to a second embodiment of the present invention.
Figure 4:
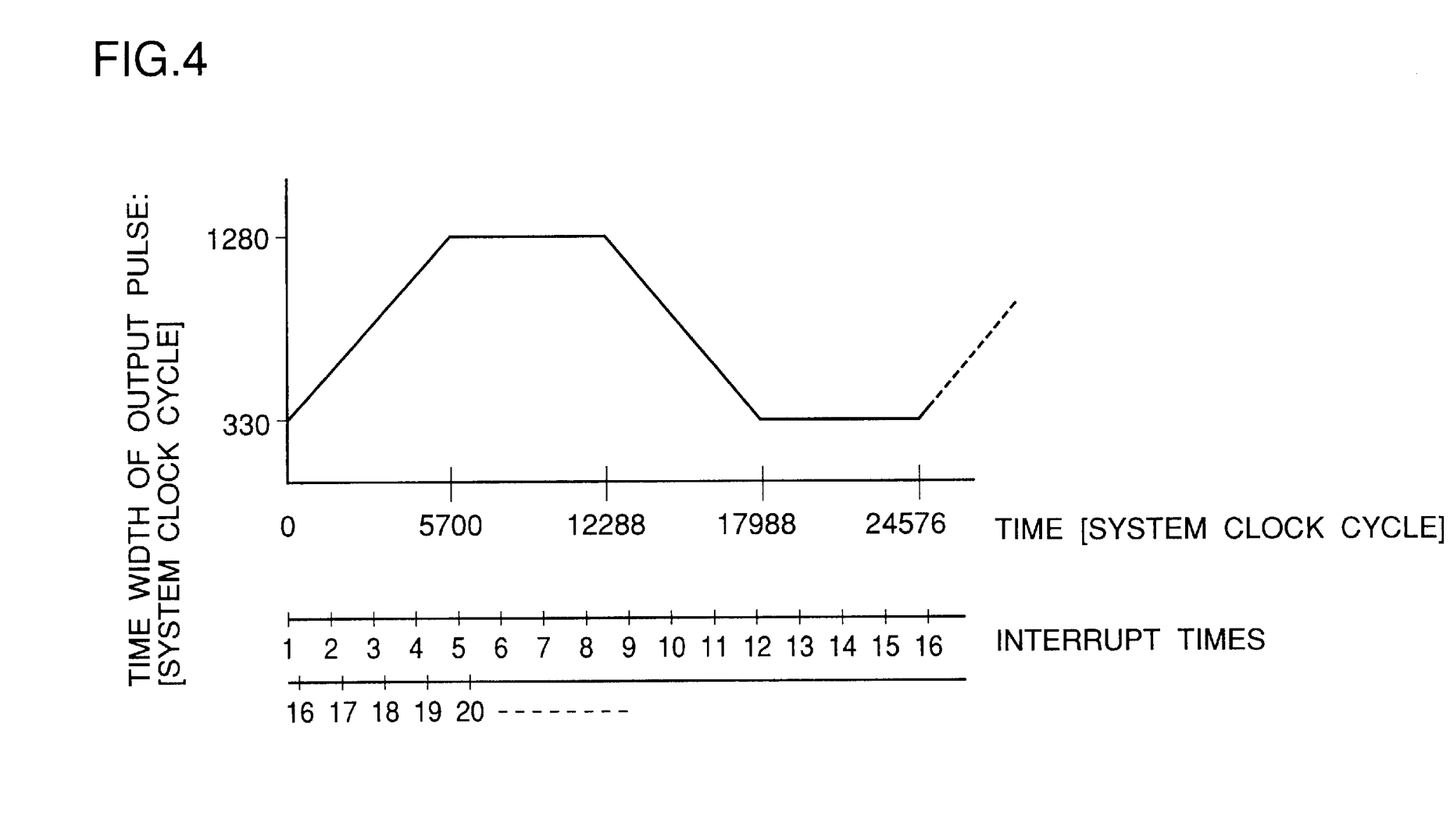
FIG. 4 is a graph showing a waveform of a pulse width modulation signal outputted for each interrupt processing in the second embodiment of the present invention.

Hereafter, with reference to FIGS. 3 and 4, an explanation is given on a method of calculating the values to be set in the comparison register 10 using the above-mentioned periodic function for each interrupt processing. Table 3 shows the number of interrupt processing times and the values to be set in the comparison register 10.

Table 3

TABLE 3

| number of interrupts | 1 | 2 | 3 | 4 | 5 | 6 | 7 |
|---|---|---|---|---|---|---|---|
| values set in register | 330 | 606 | 882 | 1158 | 1280 | 1280 | 1280 |
| number of interrupts | 8 | 9 | 10 | 11 | 12 | 13 | 14 |
| values set in register | 1280 | 1120 | 844 | 568 | 330 | 330 | 330 |
| number of interrupts | 15 | 16 | 17 | 18 | 19 | 20 | |
| values set in register | 330 | 374 | 650 | 926 | 1202 | 1280 | |

First, in the initial interrupt process where CLK=0, the judgment in S1, S2, S3, and S4 will be Yes, whereby a value to be set in the comparison register 10 is calculated in the process of A. Here, CLK represents time counted in system clock cycle. In this case, a value 330 is set in the comparison register 10. The width of the output pulse corresponds to 330 clock cycles.

In the second, third, and fourth interrupt processes where CLK=1656, 3312, and 4968 respectively, the judgment in S1, S2, S3, and S4 will also be Yes, whereby values 606, 882, and 1158 are set in the comparison register 10 through the process of A so as to output pulses having a width corresponding to the number of clock cycles.

In the fifth interrupt process, since the time counted in system clock cycle is 6624 which exceeds 5700, the judgment in S4 will be No, so that the process of B is carried out to set a value 1280 in the comparison register 10. Since the process of B is carried out also in the sixth, seventh, and eighth interrupt processes, the same value 1280 is set in the comparison register 10.

In the ninth interrupt process, since the time counted in system clock cycle is 13248 which exceeds 12288, the process of C is carried out. In this case, a value N is calculated by subtracting the time counted in system clock cycle, i.e. 13248, from 17988, and the obtained value N, i.e. 1120, is set in the comparison register 10. In the tenth and eleventh interrupt processes, a similar calculation is carried out to obtain 844 and 568, which are then set in the comparison register 10.

In the twelfth, thirteenth, fourteenth, and fifteenth interrupt processes, since the time counted in system clock cycle exceeds 17988, the process of D is carried out, whereby a value 330 is set in the comparison register 10. In the sixteenth interrupt process, since the time counted in system clock cycle exceeds 24576, the process of E is carried out. In this process, 24576 is subtracted from the time counted in system clock cycle up to this interrupt process, whereby newly calculated CLK (=CLK−24576) will now be used. In this case, the new CLK=1656×15−24576=264. By carrying out the process of A based on the above, a value 374 is set in the comparison register 10. Thereafter, the same processes as the second interrupt process are carried out, and subsequently the processes of A, B, C, and D are repeated.

As is clearly seen from the foregoing descriptions, the repetition period of the processes of A, B, C, and D for determining the time width of the pulse width modulation signal corresponds to 24576 system clock cycles. This period coincides with the period of time for one turn of the scanning motor 7. Therefore, by setting the above periodic function which varies with a period corresponding to the period of the scanning lines so as to determine a value to be set in the comparison register 10 for each interrupt process, the period of the AC voltage can be made to coincide with the period of the scanning lines. Thus, the two periods are made equal without being restricted by other components in the apparatus, whereby the generation of interference fringes can be prevented.

Here, it is to be noted that the above periodic function may be set so that the repetition period for determining the number of clock cycles in the above process is N times or 1/N times as long as the period of the scanning lines, instead of making it coincide with one period corresponding to 24576 system clock cycles.

As is apparent from the foregoing descriptions of the present invention, in the case where an AC voltage or a voltage obtained by superposing an AC voltage to a DC voltage is applied to a contact-type charger which provides a surface potential by being in contact with an image carrier, even if an unevenness of surface potential occurs by the application of the AC voltage, the generation of interference fringes due to difference between the period of the unevenness and the period of the scanning lines can be prevented. This is achieved by allowing the period of the AC voltage to be N times or 1/N times as long as the period of the scanning lines, wherein N is a natural number. Accordingly, it is possible to obtain images of high quality.

Also, since the two periods can be made equal through programmed processes by utilizing a CPU as a control means of the image formation apparatus, there is no need to provide a separate oscillator for generating the AC voltage or to add an additional circuit outside of the CPU, whereby an inexpensive image forming apparatus requiring no adjustment can be provided.

Further, by setting a periodic function which varies with a period corresponding to the period of the scanning lines, the period of the AC voltage can be allowed to coincide with the period of the scanning lines without being restricted by other components in the apparatus.

Particularly, by making the two periods completely equal, the control program will be simplified, and an image forming apparatus can be realized which is not affected by changes in the environment and which has no apparatus-by-apparatus variation.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. An image forming apparatus comprising:
   a voltage generating section for generating one of an AC voltage and a voltage obtained by superposing an AC voltage on a DC voltage;
   an image carrier;
   a contact charger for receiving the voltage generated by the voltage generating section and providing a surface potential, corresponding to the received voltage, to the image carrier by contact;
   a latent image forming section for forming a latent image by scanning the image carrier at a predetermined scanning period; and
   a control section for controlling the voltage generating section and the latent image forming section
   so that a period of an AC voltage component of the voltage generated by the voltage generating section is one of N times and 1/N times as long as the latent image scanning period, where N is a natural number.

2. The image forming apparatus of claim 1, wherein the control section includes an oscillator for generating a system clock signal, whereby the control section determines the period of the AC voltage component and the latent image scanning period based upon the system clock signal.

3. The image forming apparatus of claim 1, wherein the control section generates a pulse width modulation signal having the period of the AC voltage component, whereby the voltage generating section generates the AC voltage component based upon the pulse width modulation signal.

4. The image forming apparatus of claim 3, wherein the control section includes a memory for pre-storing a table illustrating a relationship between a time represented in system clock cycle and a pulse width represented in system clock cycle in correspondence with a waveform of one period of the AC voltage component, whereby the control section generates the pulse width modulation signal based upon a pulse width read out from the table.

5. The image forming apparatus of claim 3, wherein the control section includes a memory for pre-storing a periodic function having a period equal to that of the AC voltage component and illustrating a relationship between a time represented in system clock cycle and a pulse width represented in system clock cycle, whereby the control section generates the pulse width modulation signal based upon a pulse width calculated using the periodic function.

6. The image forming apparatus of claim 1, wherein the control section includes an oscillator for generating a system clock signal, a first frequency divider for generating a first frequency division clock signal by frequency division of the system clock signal, and a second frequency divider for generating a second frequency division clock signal by frequency division of the system clock signal, whereby the control section determines the latent image scanning period based upon the first frequency division clock signal and determines the period of the AC voltage component based upon the second frequency division clock signal, the periods of the first and second frequency division clock signals being related such that the period of the AC voltage component is one of N times and 1/N times as long as the latent image scanning period.

7. The image forming apparatus of claim 1, wherein the control section includes an oscillator for generating a system clock signal and a frequency divider for generating a frequency division clock signal by frequency division of the clock signal, whereby the control section permits the period of the AC voltage component to be one of N times and 1/N times as long as the latent image scanning period based upon the frequency division clock signal.

8. The image forming apparatus of claim 1, wherein the image carrier includes an electrophotographic photoreceptor.

9. A printer including the image forming apparatus of claim 1.

10. An image forming method comprising:

generating a voltage;

providing a surface potential, corresponding to the generated voltage, to an image carrier by contact;

forming a latent image by scanning the image carrier at a predetermined scanning period; and controlling the voltage generating and latent image forming such that a period of an AC voltage component of the generated voltage is one of N and 1/N times as long as the latent image scanning period, N being a natural number.

11. The image forming method of claim 10, wherein the period of the AC voltage component and the latent image scanning period are determined based upon a clock signal generated by an oscillator.

12. The image forming method of claim 10, wherein the controlling step includes:

generating a pulse width modulation signal; and generating the AC voltage component based upon the pulse width modulation signal.

13. The image forming method of claim 12, wherein the controlling step includes:

pre-storing a table illustrating a relationship between a time represented in system clock cycle and a pulse width represented in system clock cycle in correspondence with a waveform of the period of the AC voltage component, whereby the pulse width modulation signal is generated based upon a pulse width read out from the table.

14. The image forming method of claim 12, wherein the controlling step includes:

pre-storing a periodic function having a period equal to that of the AC voltage component and illustrating a relationship between a time represented in system clock cycle and a pulse width represented in system clock cycle, whereby the pulse width modulation signal is generated based upon a pulse width calculated using the periodic function.

15. The image forming method of claim 10, wherein the controlling step includes:

generating a clock signal;

frequency dividing the clock signal to generate the first frequency division clock signal;

frequency dividing the clock signal to generate a second frequency division clock signal;

determining the latent image scanning period based upon the first frequency division clock signal; and determining the period of the AC voltage component based on the second frequency division clock signal, the periods of the first and second frequency division clock signals being related such that the period of the AC voltage component is one of N times and 1/N times as long as the latent image scanning period.

* * * * *